No. 662,291. Patented Nov. 20, 1900.
R. L. NYE.
COMPASSES.
(Application filed Feb. 28, 1900.)

(No Model.)

Witnesses
F. M. Heaton
G. P. Davis

Reuben L. Nye,
Inventor
Edw. S. Duvall, Jr.
his Attorney

UNITED STATES PATENT OFFICE.

REUBEN L. NYE, OF BATTLE CREEK, MICHIGAN.

COMPASSES.

SPECIFICATION forming part of Letters Patent No. 662,291, dated November 20, 1900.

Application filed February 28, 1900. Serial No. 6,831. (No model.)

*To all whom it may concern:*

Be it known that I, REUBEN L. NYE, a citizen of the United States, residing at Battle Creek, in the county of Calhoun and State of Michigan, have invented certain new and useful Improvements in Compasses, of which the following is a specification.

This invention relates to improvements in compasses, and especially to those designed for work on an enlarged scale—such as compasses for schoolwork, upon blackboards, charts, &c.

One object is to provide means for quickly locking the legs of the compasses in any desired position to which they may be adjusted and to prevent the same from losing the adjustment during use. The advantage of this will be obvious.

Another object is to provide fastening or locking means which will be simple, effective, and will withstand wear, thereby rendering the compasses capable of fine adjustments after long and continued use.

Further objects are to provide compasses which may be used as a protractor, also as a straight-edge, and to provide a simple device for holding the chalk or other marking agent on the end of the circling-leg.

With these and other objects and advantages in view my invention consists in the novel and useful devices and the novel combinations and arrangements of parts fully set forth in the following description, and clearly pointed out in the claims annexed hereto and forming a part hereof.

Figure 1:
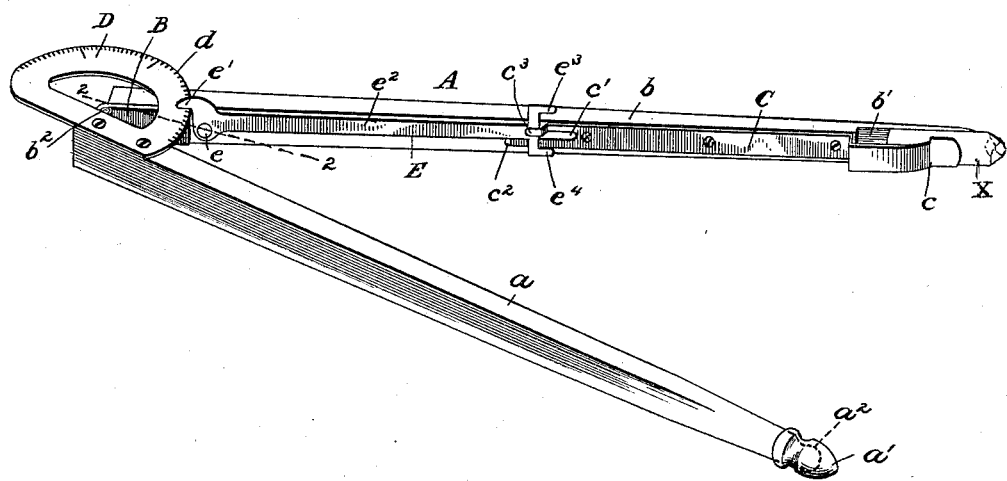
Figure 2:
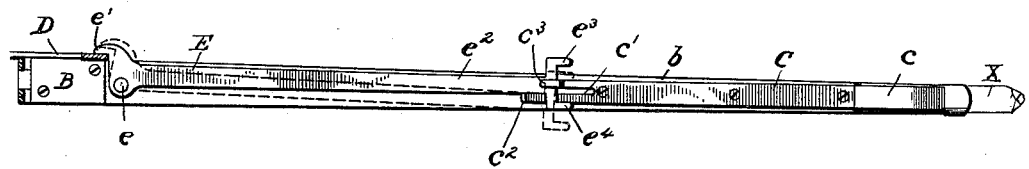
Figure 3:
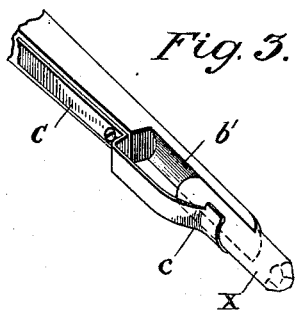

In the drawings illustrating my invention and also forming a part of this specification, Figure 1 is a perspective view of my improved compasses. Fig. 2 is a sectional view on the line 2 2 of Fig. 1 and showing by dotted lines the lever unlocked. Fig. 3 is a detail view of the chalk-holder.

Like letters of reference designate like parts in the several figures of the drawings.

A represents a pair of compasses adapted by reason of their size for use upon charts or blackboards, although my invention is suitable for numerous other uses. They are provided with the two legs $a$ and $b$, which may be constructed of wood, metal, or any other suitable material, and said legs are joined by a two-leaf hinge B. I may, however, use any other suitable form of pivotal connection, the object being to secure a hinge-joint. The leg $a$ is reduced or pointed at its end and is inserted in a socket $a^2$, formed in a pointed rubber tip $a'$. This rubber tip serves as the pivotal point of the compasses and is particularly adapted for use on surfaces where a sharp point is undesirable and a hard blunt point is liable to slip and spoil the work. When this rubber tip becomes worn and unserviceable, it may be replaced by another. It will be obvious that I may form a socket in the end of the leg $a$ and insert a pointed rubber tip therein to act as the pivotal point. The end of the other leg $b$ is constructed to receive and hold the chalk, graphite, or other marking agent. For a short distance along the inside the leg is concaved, as at $b'$, to form a seat for the chalk $x$, and a spring-clasp $c$, also concaved at the end, serves to hold the chalk securely in place through pressure upon the opposite side of the same. This clasp is in the form of an arched arm projecting from the metallic strip C, attached to the inner surface of the leg $b$ and extending along the same to the forked end of the locking-lever E. This strip of metal is bifurcated at this end, as at $c'$, and one part of the bifurcation is bent outward a short distance from the extremity to form a stop $c^2$, designed to support the lever E in a raised position. The other part of the strip C, some distance from the end, is bent outward slightly and then at an angle to form a spring-keeper $c^3$, which bears upon the forked end of the lever and retains it in its position, resting on the stop $c^2$, at which time the legs of the compasses are locked.

The locking means for fastening the compass-legs at any angle to which they may be adjusted consists of a locking-lever E, pivotally connected to the inside of leg $b$ at $e$ a short distance from the hinge-joint, and a jaw $e'$, adjacent to the pivot, which is designed to engage with the circular edge $d$ of a semicircular lock-plate D, immovably secured to the leg $a$. This plate D is secured to the pivot-leg $a$ concentrically with the pintle $b^2$ of the hinge B and with its straight-edge parallel to the edge of this leg. The jaw $e'$ overlies the circular edge of the lock-plate and is constructed to firmly grip or impinge upon the same when the locking-lever is moved to one side. It will be seen that the plate is clamped between the jaw and the edge of the hinge; but the same object may be accomplished by offsetting the jaw to clamp the plate upon the arm or a projection on the side of the arm may lie directly beneath the said jaw, between which the plate may be clamped.

The projecting corner of the semicircular plate may for convenience sake be finished off with a round edge, as shown. The surface of the said plate adjacent to the circular edge is marked with the scale of degrees from "0" to "180," so that the compasses may be used a a protractor.

The locking-lever E, which is in the form of a long arm $e^2$, pivoted at the end near the joint of the compasses, extends along the arm to the keeper $c^3$, and at this end is forked. The prongs $e^3$ and $e^4$ serve to limit the movement of the locking-lever by coming into contact with either side of the keeper, while the operator will find this forked end convenient to manipulate the lever and to lock and unlock the compasses.

The legs of the compasses are tapered on one side only, leaving the other side perfectly straight, so that when the compasses are opened to the fullest extent and the legs in alinement this side may be used as a straight-edge for ruling lines. In such use the locking-plate, as illustrated, will be found a convenient handle.

This completes the construction of my invention, and from the description of the same it will be seen that I have disclosed a very simple, useful, and inexpensive device. It will also be noted that the improvements may be readily applied to other uses—for instance, the locking device may be used, in connection with such swinging or hinged elements, as a shutter, gate, or door to secure them at any angle.

Having thus fully disclosed my invention, what I claim as new, and desire to secure by Letters Patent of the United States, is—

1. In a device of the class described, the combination with the two hinged members, of a projection secured to one of said members and overlapping the other member, a lever pivotally secured to the latter member and adapted to impinge, under pressure, upon the said projection and to bind it immovably to the said latter member and means for locking said lever when in engagement with the projection.

2. In a device of the class described, a holder for chalk or other marking agents, consisting of a concaved clasp immovably secured at one end to the compass-leg, by a spring-arm, and a concaved seat or longitudinal groove in the compass-leg, opposite to the clasp, between which and the clasp the chalk is retained by the tension of the spring-arm.

3. In a device of the class described, the combination of the hinged compass-legs, a plate secured to one leg and projecting over the other, a locking-lever having a jaw adapted to engage with said plate to lock the legs in a relatively immovable position, and means for locking said lever when its jaw is in engagement with the plate.

4. In compasses, the combination of two hinged legs, having each a straight-edge, which alines one with the other, when the compasses are fully extended, to form a ruling edge, a projection secured to one of said legs and overlapping the other member or leg, a lever pivotally secured to the latter member and adapted to impinge, under pressure, upon the said projection and bind it immovably to the said latter member, and means for locking said lever when it is in engagement with the projection.

5. In a device of the class described, the combination with the two hinged members, of a plate having a circular edge, suitably marked in degrees to form a protractor, said plate being secured to one of the members with its circular edge concentric with the joint between the hinged members, and overlapping the other member, a lever pivotally secured to the latter member and adapted to engage with the said plate to secure the said members against relative movement when adjusted, and means for locking said lever when it is in engagement with the said plate.

6. In a device of the class described, the combination with two jointed legs, of a device for locking said legs against movement, comprising a semicircular plate secured to one leg, concentrically with the joint of the compasses, a locking-lever having a jaw on the end contiguous to the plate, for clamping same to other leg, and a fork on the opposite end of the lever, a keeper engaging with said forked end, and a stop with which this end of the lever engages when in a locked position.

In testimony whereof I affix my signature in presence of two witnesses.

REUBEN L. NYE.

Witnesses:
 WM. H. STEVENSON,
 F. A. ALLWARDT.